United States Patent [19]
de Wit et al.

[11] 3,936,769
[45] Feb. 3, 1976

[54] ACOUSTO-OPTICALLY Q-SWITCHED LASER WITH MODULATED OUTPUT

[75] Inventors: Michiel de Wit, Dallas; Roddy Fro Hotz, Richardson, both of Tex.

[73] Assignee: Texas Instruments Incorporated, Dallas, Tex.

[22] Filed: Dec. 28, 1973

[21] Appl. No.: 429,319

[52] U.S. Cl.......................................... 331/94.5 M
[51] Int. Cl.² ............................................ H01S 3/10
[58] Field of Search ................................... 331/94.5

[56] References Cited
UNITED STATES PATENTS
3,297,876  1/1967  De Maria................... 331/94.5 Q
3,763,443  10/1973  Kensel et al. .............. 331/94.5 Q OTHER PUBLICATIONS
DiDomenico, Jr., et al., Locking of He–Ne Laser Modes by Intracavity Acoustic Modulation in Coupled Interferometers. Appl. Phys. Lett., Vol. 6, No. 8, Apr. 15, 1965, pp. 150–152.

*Primary Examiner*—William L. Sikes
*Attorney, Agent, or Firm*—Harold Levine; James T. Comfort; William E. Hiller

[57] ABSTRACT

A techinque for modulating the output signal of an acousto-optically Q-switched laser is disclosed. The switch is energized with an acoustic wave having a frequency equal to the approximate frequency spacing between longitudinal lasing modes of the laser. Among other advantages, the technique permits identification of lasers by length of resonator and through detection of the frequency of modulation of the laser output.

3 Claims, 5 Drawing Figures

ACOUSTO-OPTICALLY Q-SWITCHED LASER WITH MODULATED OUTPUT

FIELD OF THE INVENTION

This invention relates to lasers, and more particularly to acoustooptically Q-switched lasers.

BACKGROUND OF THE INVENTION

Since the advent of the acousto-optically Q-switched laser, as described in U.S. Pat. No. 3,725,812 to Warner C. Scott, there has been significant interest in improving such laser. In some applications it is desirable to provide a means of identification for a particular laser, to distinguish its output signal from that of other acousto-optically Q-switched lasers.

Further, as indicated in our co-pending U.S. application Ser. No. 424,115 filed Dec. 12, 1973, the disclosure of which is hereby incorporated by reference, it is desirable to increase the energy content in a single output pulse as much as possible.

Accordingly, it is a feature of the present invention to modulate the output signal of an acousto-optically Q-switched laser.

It is a further feature of the present invention to provide a means of identification of an acousto-optically Q-switched laser according to resonator length, by demodulation of the output signal.

Further features and advantages of the invention will be apparent to persons skilled in the art, from a consideration of this specification, including the claims and the drawings.

SUMMARY OF THE INVENTION

In accordance with the present invention, amplitude modulation is achieved in the output of an acousto-optically Q-switched laser, by selecting the acoustic wavelength in such manner as to shift the wavelength of light emitted from a laser rod, and which is subsequently used as feedback to maintain lasing action by an amount approximately equal to the wavelength difference between successive longitudinal lasing modes.

DETAILED DESCRIPTION OF THE INVENTION

Figure 1:
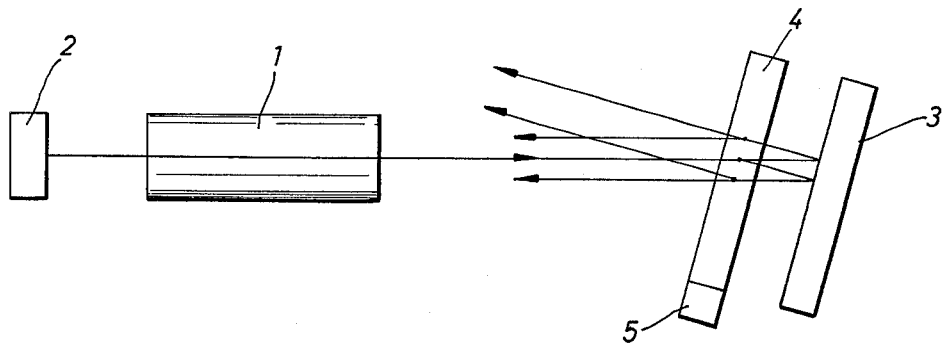
FIG. 1 is a representation of the principal elements of an acousto-optically Q-switched laser.

Referring now to FIG. 1 of the drawings, the principal elements of an acousto-optically Q-switched laser system are shown. A rod 1 of lasing material, for example, YA1G:Nd, is shown mounted between two reflectors 2 and 3. Light of appropriate lasing wavelength emitted from the left end of the rod 1 in response to pumping means (not shown), will be reflected by reflector 2 back through the rod 1. The light will then be amplified, i.e., the photons are multiplied, and will emerge from the right end of the rod 1. The amplified light passes through a Q-switching element 4, which may be, for example, fused quartz. A transducer 5 is employed to generate an acoustical wave in the Q-switch element 4 at selected times. When the transducer 5 is off, that is, not energized by an rf power source, the Q-switch element 4 is essentially transparent to the light emitted from the right side of the laser rod 1. Accordingly, such light passes to reflector 3, which, because of its tilted angle, reflects the light back through the transparent Q-switch 4, over the laser rod 1, and out of the system, and so prevents lasing action.

When the transducer 5 is energized it creates an acoustic wave in Q-switch 4 and a portion of the light beam is deflected downward, and passes to reflector 3, which reflects the light back along a line parallel to the longitudinal axis of the laser rod 1 through Q-switch 4. The undeflected portion of the light passes to reflector 3 and is reflected back through the Q-switch 4. As each portion of light reflected by reflector 3 passes through Q-switch 4 a portion of each portion is again deflected. The initially undeflected portion of light now has a part deflected downward by Q-switch 4 along a trajectory parallel to the longitudinal axis of laser rod 1 and represents feedback to maintain lasing action. The undeflected part passes over laser rod 1 and represents part of the output of the laser. The initially deflected portion of the light now has a part deflected upward by Q-switch 4 which is part of the laser output, the remainder forms part of the feedback to laser rod 1. The angle at which the Q-switch 4 and reflector 3 are tilted, is known as the Bragg angle, which is defined approximately by the relationship $$\theta \approx \lambda/\Lambda \quad \text{(Eq.1)}$$

where $\theta$ is the Bragg angle, in radians;
$\lambda$ is the wavelength of laser light in vacuum; and
$\Lambda$ is the acoustic wavelength in Q-switch 4.

A standing wave pattern, necessary for lasing action, will be established between reflectors 2 and 3 whenever the condition $$, d = N \lambda/2 \text{ is satisfied,} \quad \text{(Eq. 2)}$$

where $d$ is the optical path length between the two reflectors 2 and 3; and
$N$ is an integer.

For the same length resonator, $d$, a second "mode" exists where $$, d = (N+1) \lambda'/2 \quad \text{(Eq. 3)}$$

Thus it is seen that $\lambda$ and $\lambda'$ are each distinct wavelengths capable of forming standing-wave patterns in the same resonator, and hence capable of producing lasing action. There are additional lasing wavelengths, or modes, correponding to $2d/(N+2)$, $2d/(N+3)$, etc.

Figure 2:
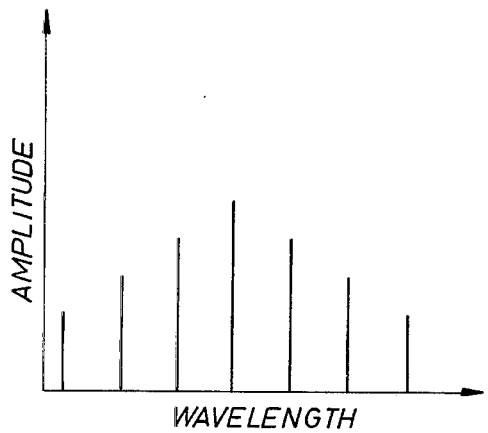
FIG. 2 is a representation of a laser output signal having discrete wavelength components.

In practical terms, it should be recognized that N is quite large. Since the length of the resonator, $d$, is typically about 1 meter, and the light wavelength is approximately one micron, N is about $10^6$. Accordingly, the wavelength difference between the first two modes, $2d/N - 2d/N+1$, may be considered essentially constant for subsequent adjacent modes. The same is, of course, true for frequency spacing between modes. The laser output therefore consists of a number of discrete-wavelength pulses, and the wavelength difference from one pulse to the next is essentially constant, as shown schematically in FIG. 2.

Figure 3:
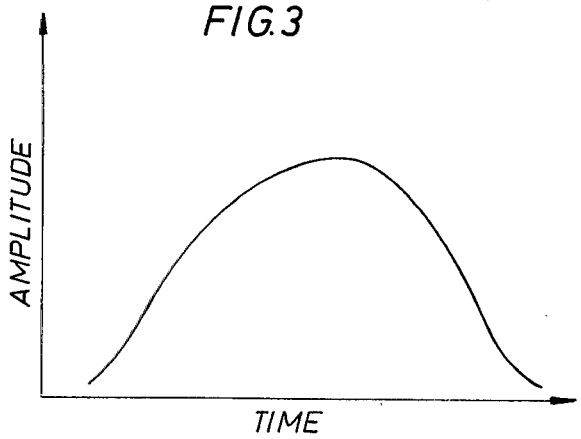
FIG. 3 is a representation of the amplitude of the laser output signal, as a function of time.

Summing these different-wavelength pulses of contributing modes in the output produces an output pulse of a configuration illustrated in FIG. 3 of the drawings.

Figure 4:
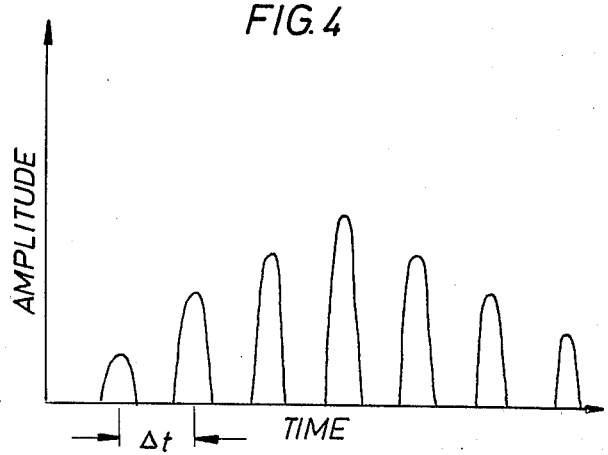
FIG. 4 is a representation of a mode-locked laser output signal.

As is known in the art, if the various discrete frequency components of the output can be made to have the same phase angle at a given instant, the output waveform will ideally take the configuration shown in FIG. 4 of the drawings. It is seen here that the output consists of a series of separate spikes. The time interval between each pair of spikes, $\Delta t$, is proportional to $1/\Delta f$ where $\Delta f$ is the frequency difference between adjacent modes; and the width of each spike is a function of M, where M is the number of participating modes. An output configuration such as shown in FIG. 4, therefore, is indicative of mode-locking, i.e., the participating modes are in phase at the time of each spike.

According to the present invention, a phenomenon akin to mode-locking is achieved by selection of the acoustic-wavelength such that each frequency component of the lasing light that is used as feedback will be shifted in frequency by an amount equal to $\Delta f$, as above defined, or some multiple or sub-multiple thereof.

The frequency of the Bragg-deflected portion of any beam moving through the resonator 1 while the Q-switch is on is given by $$f = f_{in} \pm f_{ac},$$

where $f_{in}$ is the frequency of light entering the switch; and $f_{ac}$ is the frequency of the acoustic wave.

Therefore, if $f_{ac}$ is selected so as to be approximately equal to the spacing between longitudinal modes, as above described, the frequency of an incoming light wave will be shifted to the adjacent mode. If a multiple of $\Delta f$, for instance, $2 \Delta f$, is used for $f_{ac}$, the incoming light wave will have its frequency shifted by two modes. If a submultiple of $\Delta f$, for instance ½ $\Delta f$, is used for $f_{ac}$, two passes through the resonator will shift the light frequency by $\Delta f$, to the adjacent mode.

Figure 5:
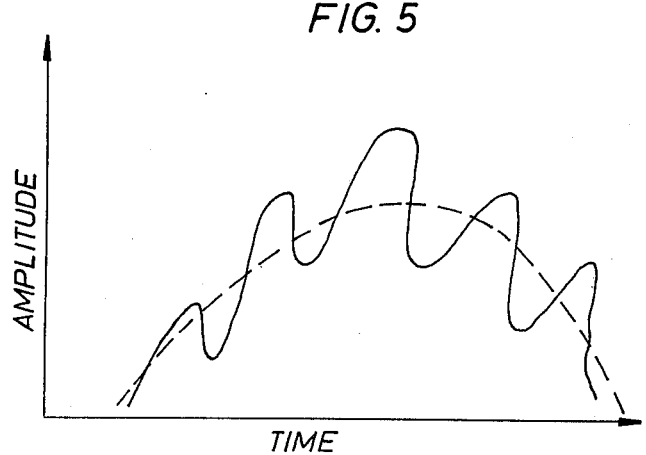
FIG. 5 is a representation of a laser output signal with modulation, obtained by the technique of the present invention.

In practice thus far, we have found that the output waveform is a modulated curve such a illustrated in FIG. 5, rather than a true modelocked form as in FIG. 4. It is believed that such difference is due to the lack of exact equality in the mode spacing, because of the dispersion of the lasing medium but it is possible that the phenomenon here involved is not true mode-locking. The transverse modes also are present with different spacings from the longitudinal ones, so that the wavelength spectrum is much richer than shown in FIG. 2. A mode-locked train of narrow pulses generally requires that all but one of the transverse modes is eliminated, but this lowers the laser efficiency and output and is undesirable. In any event, the period of the modulating "ripple", shown in FIG. 5, is inversely proportional to the frequency spacing of adjacent lasing modes, and this is enough to permit employment of the technique for laser-identification purposes.

The foregoing technique may be employed to provide identification of a particular acousto-optically Q-switched laser. Since the frequency of the ripple is directly proportional to the wavelength difference between modes, and since the wavelength difference between modes is, according to equations 2 and 3, a direct function of the resonator length, laser resonators of different lengths will produce ripples of different frequencies. Accordingly, to determine which of several lasers of different lengths is producing a given laser output signal, it is only necessary to demodulate the output and determine the frequency of the modulating ripple signals.

It has been found possible in practice to modulate the output signal by 60–70 percent, apparently due to partial mode-locking, with a ripple period of 5–10 nanoseconds long pulse.

It may be possible with the foregoing technique to produce truly isolated spikes in the output, similar to the configuration shown in FIG. 4.

What is claimed is:

1. A method of modulating the output of an acousto-optically Q-switched laser including a lasing means and two reflectors, with an acousto-optic Q-switch between said lasing means and one of said reflectors, said method comprising:

transmitting a light beam as the output from the lasing means toward the Q-switch and said one reflector, activating said Q-switch by introducing acoustic energy thereinto having a frequency approximately equal to the frequency difference between adjacent longitudinal modes of the light beam output or a multiple or submultiple thereof as the light beam output passes through the Q-switch, feeding back at least a portion of the light beam output by said one reflector, and modulating the light beam output as a consequence of said Q-switch activation as it is fed back by said one reflector by shifting the frequency of the feedback light beam in an amount equal to the frequency difference between adjacent longitudinal lasing modes or a multiple or submultiple thereof to produce a resultant modulated lasing output waveform.

2. A method of modulating the output of an acousto-optically Q-switched laser as set forth in claim 1, wherein the acoustic energy introduced into said Q-switch for activating same is selected so as to be approximately equal to the frequency difference between adjacent longitudinal modes of the light beam output, whereby the frequency of the feedback light beam is shifted to the adjacent longitudinal lasing mode.

3. A method of identifying an acousto-optically Q-switched laser including a lasing means and two reflectors, with an acousto-optic Q-switch between said lasing means and one of said reflectors, by its output pulse characteristic, said method comprising:

transmitting a light beam as the output from the lasing means toward the Q-switch and said one reflector, activating said Q-switch by introducing acoustic energy thereinto having a frequency approximately equal to the frequency difference between adjacent longitudinal modes of the light beam output or a multiple or submultiple thereof as the light beam output passes through the Q-switch, feeding back at least a portion of the light beam output by said one reflector, modulating the light beam output as a consequence of said Q-switch activation as it is fed back by said one reflector by shifting the frequency of the feedback light beam in an amount equal to the frequency difference between adjacent longitudinal lasing modes or a multiple or submultiple thereof to produce a resultant modulated lasing output pulse, demodulating the modulated lasing output pulse, and determining the frequency of modulation.

* * * * *